(12) United States Patent
Kindt et al.

(10) Patent No.: US 6,661,500 B1
(45) Date of Patent: Dec. 9, 2003

(54) INTEGRATED RANGE FINDER AND IMAGER

(75) Inventors: Willem J. Kindt, Sunnyvale, CA (US); Brian D. Segerstedt, Redwood City, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/098,230

(22) Filed: Mar. 15, 2002

(51) Int. Cl.[7] ............................. G01C 3/08; G01C 1/00; G01B 11/26

(52) U.S. Cl. ................... 356/5.04; 356/5.01; 356/141.1

(58) Field of Search ............................. 356/5.01–5.08, 356/141.1; 250/208.1; 396/123

(56) References Cited

U.S. PATENT DOCUMENTS

| | | | | |
|---|---|---|---|---|
| 5,220,164 A | * | 6/1993 | Lieber et al. ......... | 250/214 VT |
| 5,528,354 A | * | 6/1996 | Uwira ....................... | 356/5.01 |
| 6,323,942 B1 | * | 11/2001 | Bamji ....................... | 356/5.01 |
| 6,346,980 B1 | * | 2/2002 | Tani et al. ................. | 356/4.01 |
| 6,392,747 B1 | * | 5/2002 | Allen et al. .............. | 356/141.1 |
| 6,448,572 B1 | * | 9/2002 | Tennant et al. ......... | 250/559.38 |

OTHER PUBLICATIONS

D.J. Stack et al., "Target Acquisition and Tracking System based on a Real–Time Reconfigurable, Multi–Window CMOS Image Sensor," *Proceedings of SPIE* vol. 4025, 2000, pp. 170–181.

E.R. Fossum, "CMOS Image Sensors: Electronic Camera–On–A–Chip," *IEEE Transactions on Electron Devises*, vol. 44, No. 10, Oct. , 1997, pp. 1689–1698.

H.C. van Kuijk et al., "Sensitivity Improvement in Progressive–Scan FT–CCDs for Digital Still Camera Applications," *International Electron Devices Meeting, San Francisco, CA, Technical Digest*, 2000, pp. 689–692.

* cited by examiner

*Primary Examiner*—Thomas H. Tarcza
*Assistant Examiner*—Brian Andrea
(74) *Attorney, Agent, or Firm*—Merchant & Gould; Mark R. Hennings

(57) ABSTRACT

An image sensor is disclosed that contains pixel cells that can individually provide a real-time output signal that is proportional to the instantaneous magnitude of incident radiation upon each pixel cell. The individual real-time output signals can be used to construct an electronic image. Additionally, the pixel cells of the image sensor can be used to collectively provide an accumulated real-time output signal that is proportional to the instantaneous magnitude of incident radiation upon a plurality of selected pixel cells. A propagated signal from a source such as a laser can be used to illuminate a target in an image. A reflection from the target can be detected in the accumulated real-time output signal. The range to the target can be determined using the round-trip propagation time between the sensor and the target of a propagated signal.

20 Claims, 8 Drawing Sheets

INTEGRATED RANGE FINDER AND IMAGER

FIELD OF THE INVENTION

The present invention relates generally to imaging systems, and more particularly to an image sensor architecture that integrates the functions of imaging and range-finding.

BACKGROUND OF THE INVENTION

Image sensors convert an optical image into an electronic signal. An optical image is a visual representation of a scene. A scene contains objects that may be illuminated by light that is visible and/or outside the visible portion of the spectrum (i.e., illuminated by electromagnetic radiation). The light may be from passive (or incidental) light or from active light sources. The light from a scene can be detected by a sensor and converted into an electronic image.

Range finders may be used to determine a relative range to an object. The range may be based on the frame of reference of an observer or may be based upon an arbitrary reference point. A range finder determines ranges to illuminated objects by analyzing the propagation times of propagated signals. Ranging often includes "bouncing" (i.e., causing to be reflected) a propagated signal off of an object for which a range is desired and measuring the length of the time required for the signal to propagate. The range can be determined by multiplying the rate of propagation by the time required to propagate the signal from the object to the sensor.

SUMMARY OF THE INVENTION

The present invention is directed towards an apparatus and method that integrates the functions of imaging and range-finding. An image sensor is disclosed that contains pixel cells that can individually provide a real-time output signal that is proportional to the instantaneous magnitude of incident electromagnetic radiation upon each pixel cell. The pixel cells of the image sensor can be used to collectively provide an accumulated real-time output signal that is proportional to the instantaneous magnitude of incident electromagnetic radiation upon a plurality of selected pixel cells.

According to one aspect of the invention, a system for range-finding and imaging comprises a pixel array, a pixel selector, and a summer. The pixel array is comprised of pixel cells. Each pixel cell is capable of producing a real-time output signal that is proportional to the instantaneous magnitude of incident radiation upon each pixel cell. The pixel selector is configured to select pixel cells in response to a set of target pixel cells. The summer is configured to accumulate the real-time output signals from a plurality of selected pixel cells and provides an accumulated signal in response.

According to another aspect of the invention, a method for imaging and range-finding comprises selecting a set of pixel cells from within a pixel cell array. A real-time output signal is produced for each selected pixel cell. The real-time output signal is proportional to the instantaneous magnitude of incident radiation upon each selected pixel cell. The real-time output signals from the selected pixel cells are summed. An accumulated signal is provided in response to the sum of the real-time output signals from the selected pixel cells.

DETAILED DESCRIPTION OF THE PREFERRED EMBODIMENT

Figure 1:
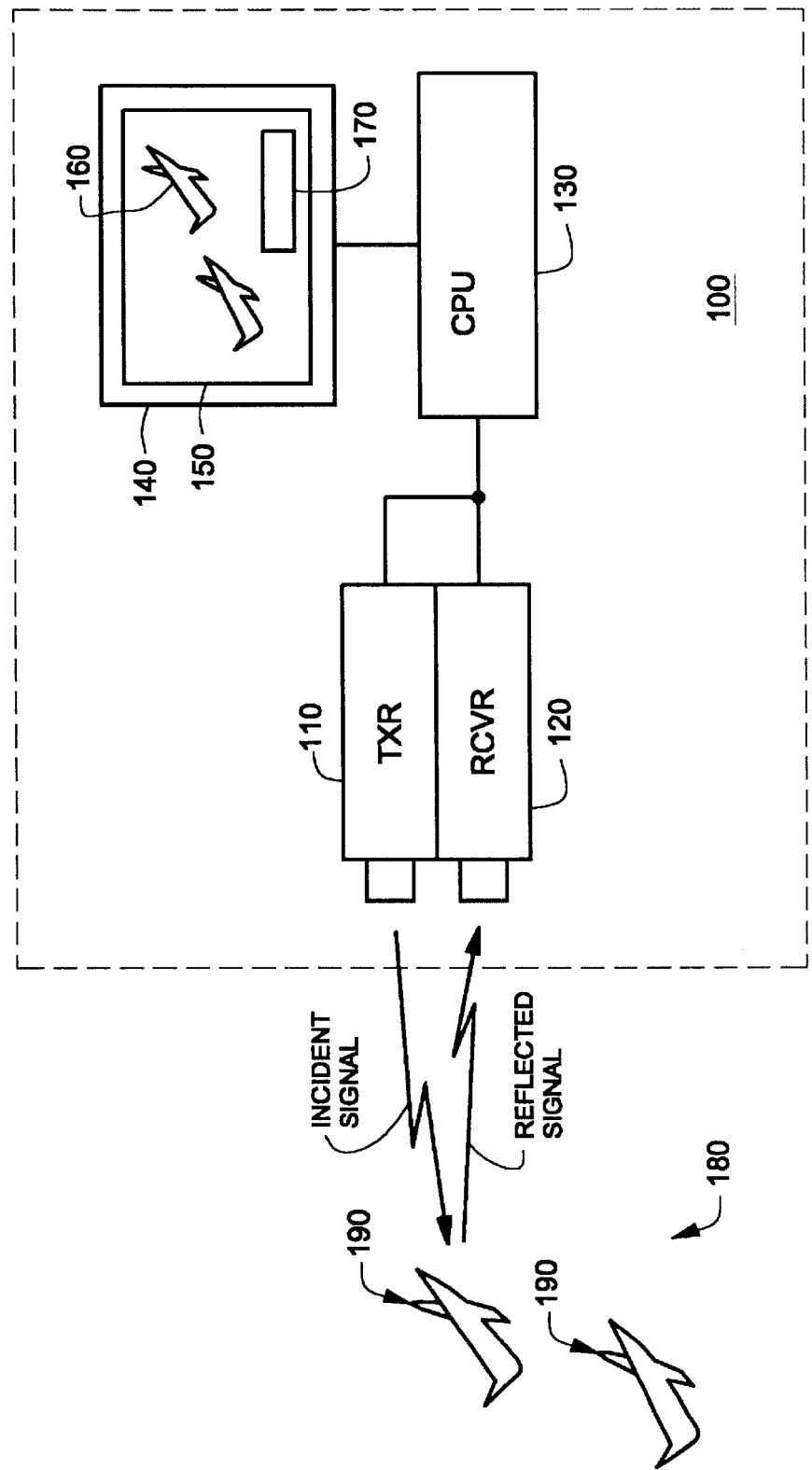
FIG. 1 shows an overview schematic of an imaging and range-finding system in accordance with the present invention.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one charge, current, voltage, or data signal. Referring to the drawings, like numbers indicate like parts throughout the views.

The present invention is directed towards an apparatus and method that integrates the functions of imaging and range-finding. An image sensor is disclosed that contains pixel cells that can individually provide a photocurrent that is proportional to the instantaneous magnitude of incident radiation upon each pixel cell. In imaging mode, each pixel cell produces a photocurrent that can be integrated to form a charge that is proportional to the magnitude of incident radiation upon each pixel cell over the integration interval. The individual integrated charges can be read by column charge amplifiers for the purpose of constructing an electronic image.

In ranging mode, the photocurrents of the pixel cells of the image sensor can be used to collectively provide an accumulated real-time output signal. The accumulated real-time output signal is proportional to the instantaneous magnitude of incident radiation upon a plurality of selected pixel cells. An incident signal from a source such as a laser can be used to illuminate a target. A reflected signal (e.g., reflected light) is produced when the incident propagated signal reflects off of the target. A reflected signal from the target can be detected in the accumulated real-time output signal. The range to the target can be determined by measuring the time required for light to travel from the laser to the target and back, dividing the required travel time by two, and multiplying the divided time by the speed of light.

FIG. 1 shows an overview schematic of an imaging and range-finding system in accordance with the present invention. As shown in the figure, imaging and range-finding system 100 includes transmitter 110, receiver 120, CPU 130, display 140, touchscreen 150, image 160, and range indicator 170.

Imaging and range-finding system 100 uses an imaging mode and a range-finding mode to determine the range of targets 190 that are present in scene 180. In imaging mode, imaging and range-finding system 100 receives light from a scene 180 in receiver 120. Scene 180 may be illuminated by passive light (i.e., light that is "naturally" present in scene 180) or by active light sources that are controlled by system 100. In one embodiment, transmitter 110 may be used to illuminate scene 180. Receiver 120 (using an image sensor) converts the received light into an image signal and conveys the image signal to CPU 130. CPU 130 may process the image signal for display on optional display 140 as image 160. Objects that are present in image 160 are used to define sets of target pixels for which range information will be obtained.

CPU 130 and optionally display 140 may be used to select objects for which sets of target pixels are defined. CPU 130 typically processes the image signal to detect the presence of objects and the boundaries of the detected objects. The boundary of a detected object is used to define a set of target pixels for that object. In one embodiment, the set of target pixels is a rectilinear block of pixels that lies within the boundary of a detected object. A set of target pixels may be defined by providing pixel coordinates of opposing corners of the rectilinear block.

Display 140 may be used to allow an operator to select targets (and to designate priorities for targets) from amongst objects that are visible in image 160. CPU 130 may optionally highlight the presence of detected objects in image 160 by including indicators, image enhancement, false coloring, and the like. The operator may select objects of particular interest that lie in image 160 by touching optional touchscreen 150, which overlies image 160. CPU 130 correlates the coordinates received from a touchscreen 150 with the locations of determined objects within image 160. CPU 130 may highlight a designated object in image 160 in accordance with the selection of the designated object from touchscreen 150.

In range-finding mode, system 100 determines the range of the selected objects within a scene. An example system 100 determines the range of selected targets 190 that have been identified during imaging mode. CPU 130 selects (and prioritizes) targets 190 for which ranges will be determined. CPU 130 provides the boundaries of a set of target pixels to receiver 120. Receiver 120 selects the pixels that correspond to the boundaries of the set of target pixels. Each selected pixel cell can individually provide a real-time output signal that is proportional to the instantaneous magnitude of incident radiation upon each pixel cell. The outputs of the selected pixel cells are combined in real-time to provide an accumulated real-time output signal. The accumulated real-time output signal is proportional to the instantaneous magnitude of incident radiation upon the selected pixel cells. The accumulated real-time output signal may be displayed on range indicator 170.

Figure 2:
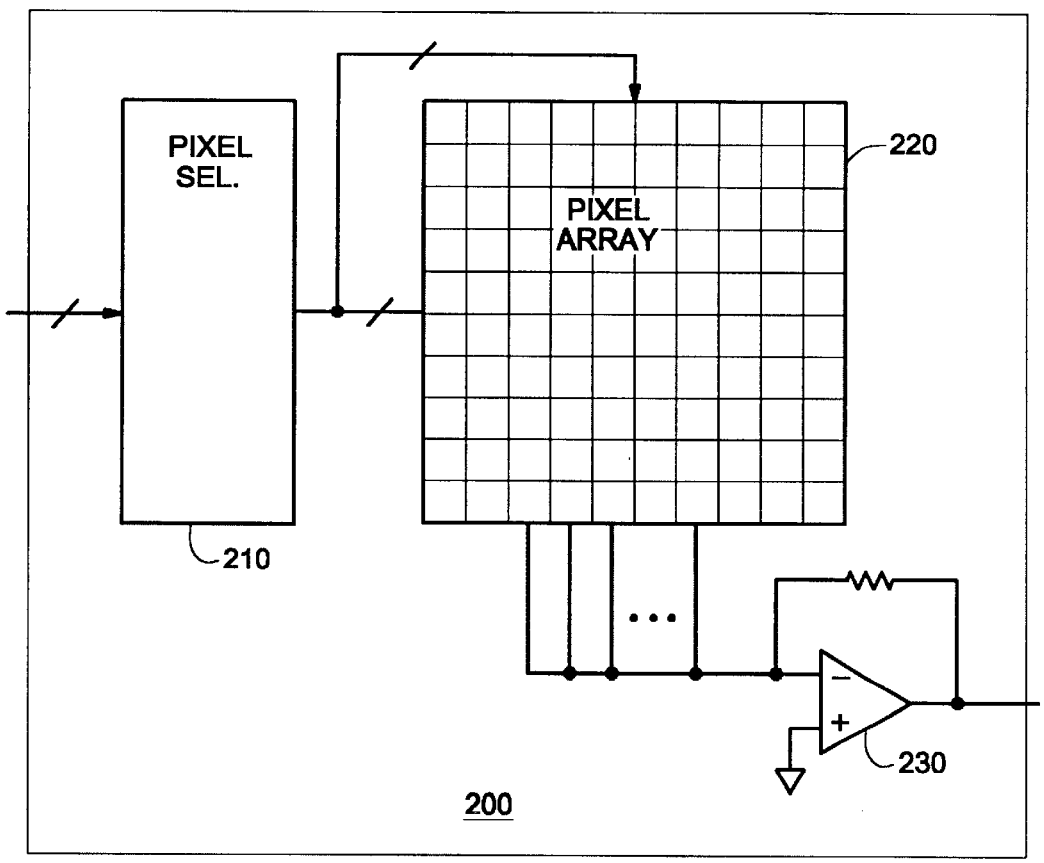
FIG. 2 shows an overview schematic diagram of an example range finder circuit 200 for an imaging and range-finding system in accordance with the present invention.

FIG. 2 shows an overview schematic diagram of an example image sensor 200 used in a range-finding mode of an imaging and range-finding system in accordance with the present invention. Pixel selector 210 receives information from CPU 130 that is related to the boundaries of a selected set of target pixels. According to one embodiment, pixel selector 210 identifies a top row, bottom row, left-most column, and right-most column according to the received information related to the selected set of target pixels. Pixel selector 210 selects the rows of pixels in pixel array 220 that are identified by the top row and bottom row of the selected set of target pixels. Selecting a row of pixels enables the outputs of pixel cells contained within the selected row. Pixel selector 210 selects the columns of pixels identified by the left-most column and right-most column of the selected set of target pixels. Selecting columns of pixels allows the outputs of row-selected pixel cells within each selected column to be simultaneously coupled to the input of summer 230. Summer 230 provides an accumulated real-time output signal that is based upon the combined outputs of pixel cells that correspond to the selected set of target pixels. The accumulated real-time output signal is proportional to the instantaneous magnitude of incident radiation upon the pixel cells that lie within the selected set of target pixels.

Referring again to FIG. 1, CPU 130 directs transmitter 110 to transmit at a certain time an incident signal (such as a short pulse of coherent light) towards an identified target 190. The incident signal may be spread (by optical lenses, for example) to illuminate scene 180 and cause a reflected signal from each target 190 to be directed towards receiver 120. Inside the image sensor of receiver 120, a group of pixel cells corresponding to a target is selected. The photocurrents from the selected pixel cells are accumulated to provide an accumulated real-time output signal as discussed above.

CPU 130 monitors the accumulated real-time output signal for a reflected signal. CPU 130 determines the time interval between the transmission time of the pulse of coherent light and the detection of a reflected signal in the accumulated real-time output signal. The range to the target can be determined by using factors such as the speed of light, the relative positions of transmitter 110 to receiver 120, and the time interval required for light to travel from transmitter 110 to receiver 120. CPU 130 may optionally display the determined range on range indicator 170 on image 160. In a similar fashion, ranges for multiple identified targets 190 can be determined and displayed on range indicator 170.

Image intensification techniques may be used extend the range of the imaging and range-finding system. Without use of an image intensifier (i.e., in "unintensified optical mode"), the range of the system is relatively short. By placing an image intensifier before image sensor 120 (i.e., in "intensified optical mode"), the reflections are amplified such that the range of the system is increased. By placing the image sensor within the image intensifier (i.e., in "electron bombardment mode"), the range of the system can be increased even further as described below.

Figure 3:
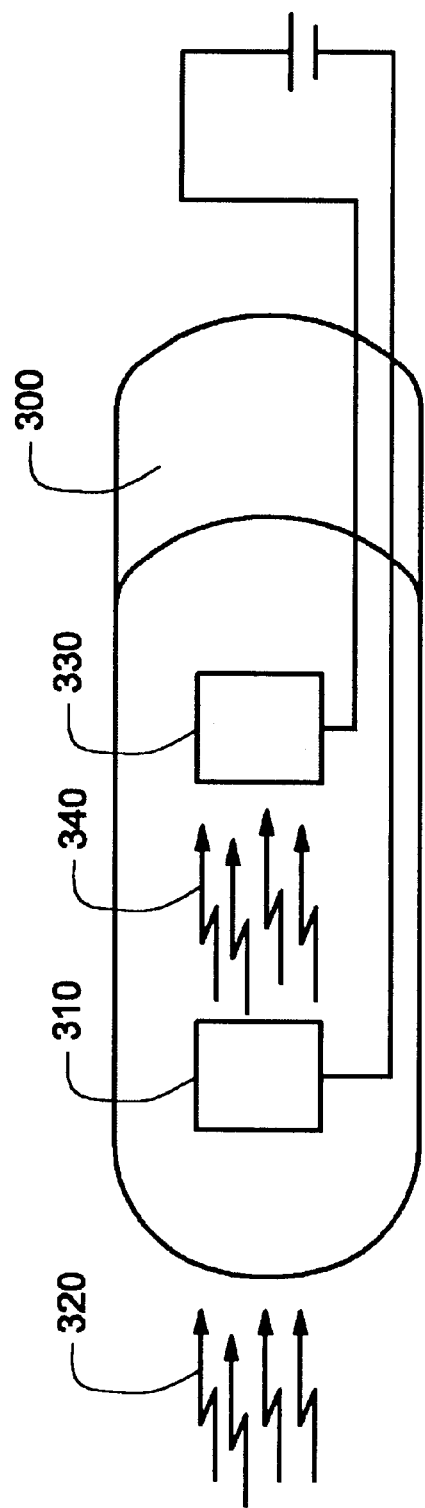
FIG. 3 shows a schematic diagram of an example vacuum image intensifying tube in accordance with the present invention.

FIG. 3 shows a schematic diagram of an example vacuum image intensifying tube. Placing an image sensor in vacuum image intensifying tube 300 can enhance the effect of light upon the image sensor in both the imaging and range-finding modes. Vacuum image intensifying tube 300 comprises photocathode 310 (upon which light 320 from a scene is directed) and silicon-based image sensor 330. Photocathode 310 and image sensor 330 are typically located in opposing sides of the vacuum image intensifying tube. Photocathode 310 is biased at a large negative potential relative to image sensor 330. Photons impinging upon photocathode 310 create free electrons inside the vacuum tube. The bias voltage across photocathode 310 and image sensor 330 will accelerate free electrons towards the sensor. When the accelerated electrons hit the surface of image sensor 330, a large number of electron hole pairs are created inside the photodiodes of image sensor 330. In contrast, only one electron hole pair is created by a photon that directly impinges upon a silicon-based image sensor. Thus, the use of a vacuum image intensifying tube allows electronic images to be formed in lower light situations.

Image sensor 330 can be made more sensitive to high-energy electrons by performing additional semiconductor processing steps upon image sensor 330. For example, the dielectric oxide on the surface of the sensor may be thinned or removed to expose the silicon surface of the sensor to the electrons. Alternatively, the substrate of image sensor 330 may be thinned to allow electrons to enter the photodiodes of image sensor 330 from the back surface.

Figure 4:
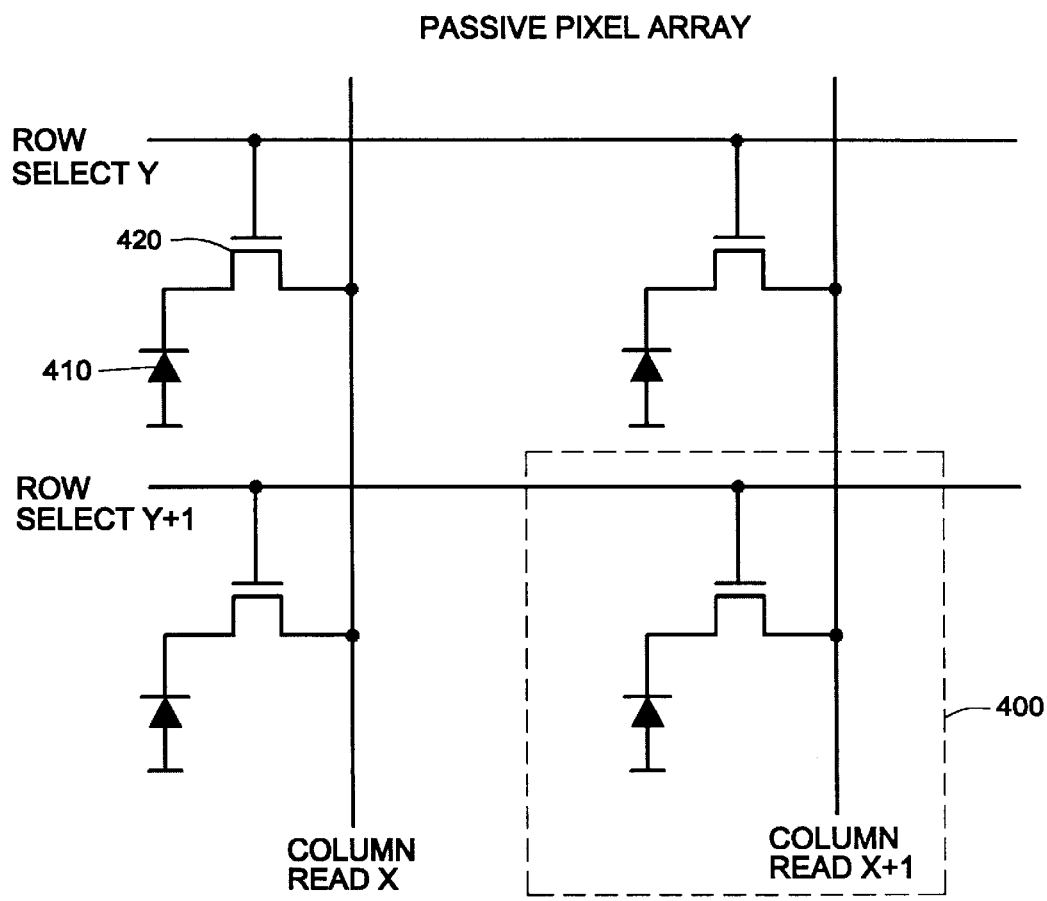
FIG. 4 is a schematic diagram of example one-transistor passive pixel cells used in an image sensor according to the present invention.

FIG. 4 is an overview schematic diagram of example one-transistor passive pixel cells within an image sensor according to the present invention. Each passive pixel cell 400 comprises photodiode 410, select transistor 420, a row select line, and a column read line. A one-transistor passive pixel cell architecture allows pixel cells to have a higher fill factor for a given pixel size. The fill factor is defined as the ratio of the sensitive pixel area to the total pixel area. The higher fill factor provides a higher signal-to-noise ratio, especially where light levels are relatively low.

In imaging mode, a row of pixels in a passive pixel array is selected by pulsing a row select line high. Each photodiode that is in the selected row of pixels can be individually accessed through the column read lines. Through the column read lines, the row-selected photodiodes are charged up to a certain voltage. Subsequently, the row select signal is turned off and the charged photodiodes are arranged to integrate. During integration, the photons incident on the charged photodiodes (or accelerated electrons when being used in an electron bombardment imaging mode) creates a photocurrent in the photodiode that slowly discharges the charged photodiode to a lower potential. After a certain integration time, the slowly discharged photodiodes can be accessed through the column read lines again by enabling the row select line. At this point, the intensity of incident light upon a particular photodiode during the past integration interval can be determined. The incident light during the integration interval is determined by measuring the amount of charge that is required to recharge the photodiode to its original bias potential.

In range-finding mode, pixel cells that are defined by a set of target pixels are summed together in real-time. In one embodiment the coordinates of two corners of a rectilinear block define a set of target pixels. One or more corresponding row select lines are enabled and one or more corresponding column read lines are multiplexed together such that photocurrents from the pixel cells defined by the set of target pixels can be measured in real-time. The photocurrent signals from the defined pixel cells can be measured by allowing the multiplexed currents to flow through the feedback resistor in a transimpedance amplifier such that a real-time voltage output signal is produced. The real-time voltage output signal is proportional to the instantaneous amplitude of a signal reflected from a potential target in an object scene that is illuminated.

Figure 5:
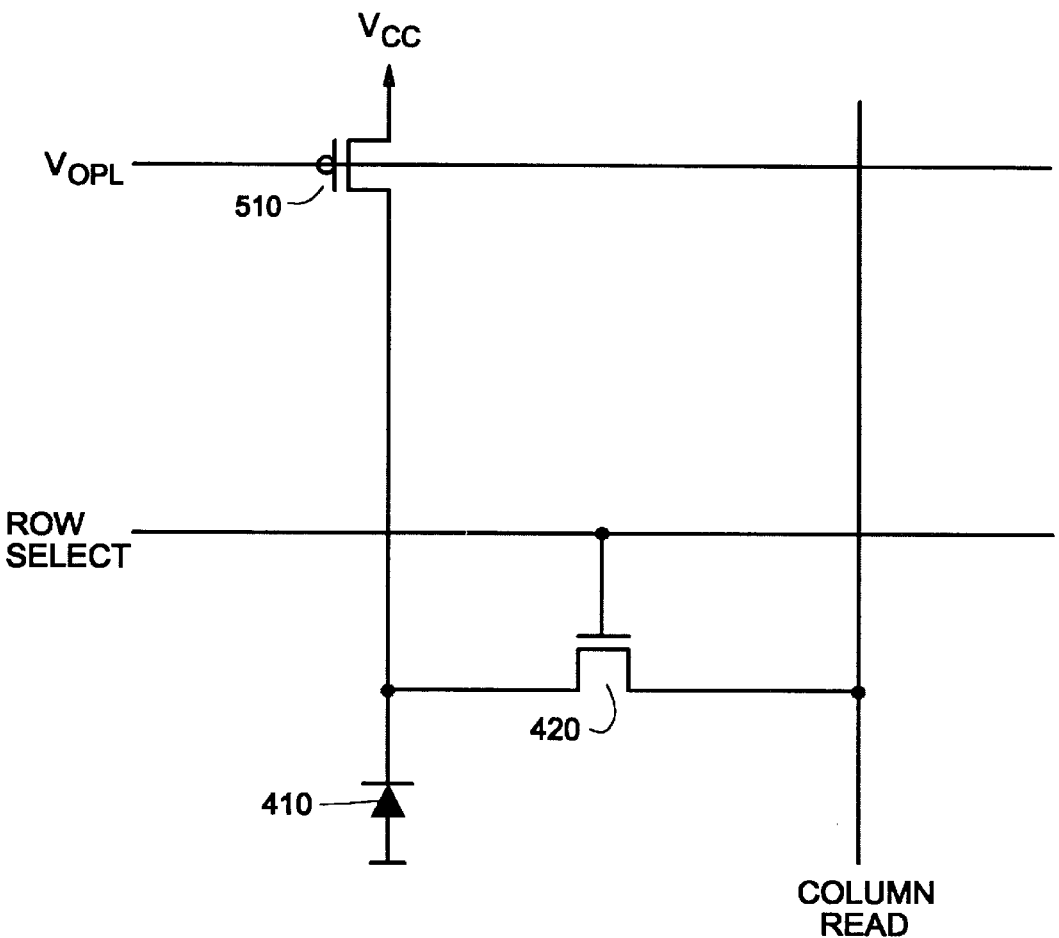
FIG. 5 is a schematic diagram of an example two-transistor passive pixel cell used in an image sensor according to the present invention.

In an alternate embodiment, a two-transistor passive pixel cell can be used. FIG. 5 is a schematic diagram of an example two-transistor passive pixel cell used in an image sensor according to the present invention. Two-transistor passive pixel cell 500 operates in similar fashion to one-transistor passive pixel cell 400, except as described below. Each two-transistor passive pixel cell comprises photodiode 410, select transistor 420, antiblooming transistor 510, a row select line, a column read line, and a voltage overflow line ($V_{OFL}$). Antiblooming transistor 510 is arranged to prevent an overexposed photodiode from causing blooming during integration. During integration, the potential on an overexposed photodiode drops to around zero volts such that the overexposed photodiode is no longer reversed biased. When the photodiode is no longer reversed biased, the photodiode is no longer capable of storing the charge that is generated by a photocurrent. Any excess electrons that are generated by photons inside the photodiode will be injected into the substrate when the diode potential has dropped to zero volts. The injected electrons can diffuse through the substrate and may be collected by neighboring pixels. Thus, a small bright spot in an image may result in the pixel array producing an electronic image that contains a large overexposed area due to the "blooming" effect.

The gate of antiblooming transistor 510 is biased at a slightly larger potential than its own threshold voltage. Biasing antiblooming transistor 510 to a higher potential allows any excess photocurrent produced by an overexposed photodiode to flow through transistor 510. The current path through antiblooming transistor 510 prevents undesirable electron injection into the substrate such that blooming is minimized in the electronic image produced by the sensor.

The two-transistor passive pixel cell structure (500) can be applied to addressing problems that arise from offset and gain mismatches in the devices that are used to detect pixel charges within a column. In one embodiment, individual charge amplifiers are used to detect pixel charges from selected pixels within a column. Offset and gain mismatches between various individual charge amplifiers results in columnar fixed pattern noise in the electronic image produced by the sensor. Normalizing values produced by each individual charge amplifier reduces columnar fixed pattern noise, which results from offset and gain mismatches between the individual charge amplifiers.

The offset and gain of each individual charge amplifier can be measured by providing rows of "black" pixels and rows of reference pixels within pixel array 500. Black pixel cells can be formed by maintaining an opaque layer over certain pixels of the pixel array 500. The opaque layer can be formed by various means including by not etching holes in the oxide above the photodiodes. Reference cells can be formed by using antiblooming transistor 510 to switch a certain reference voltage level to the photodiode of a reference cell. Applying a reference voltage to the photodiode allows the photodiode to be charged to a known voltage prior to measuring the charge of the photodiode. Using antiblooming transistor 510 in reference cells for purposes of calibration (and not for purposes of antiblooming) advantageously allows for layout symmetry of pixel cells within pixel array 500. The reference voltage may be continuously applied to the reference cells (except for the time in which the charge in the cell is read) in order to prevent blooming in the event an opaque layer is not present over the photodiode of the reference cells. The signals generated by the black pixels and the reference level pixels can be used as reference points to calculate offset and gain calibration coefficients such that offset and gain errors (that are introduced by individual column charge amplifiers) may be removed or canceled.

Figure 6:
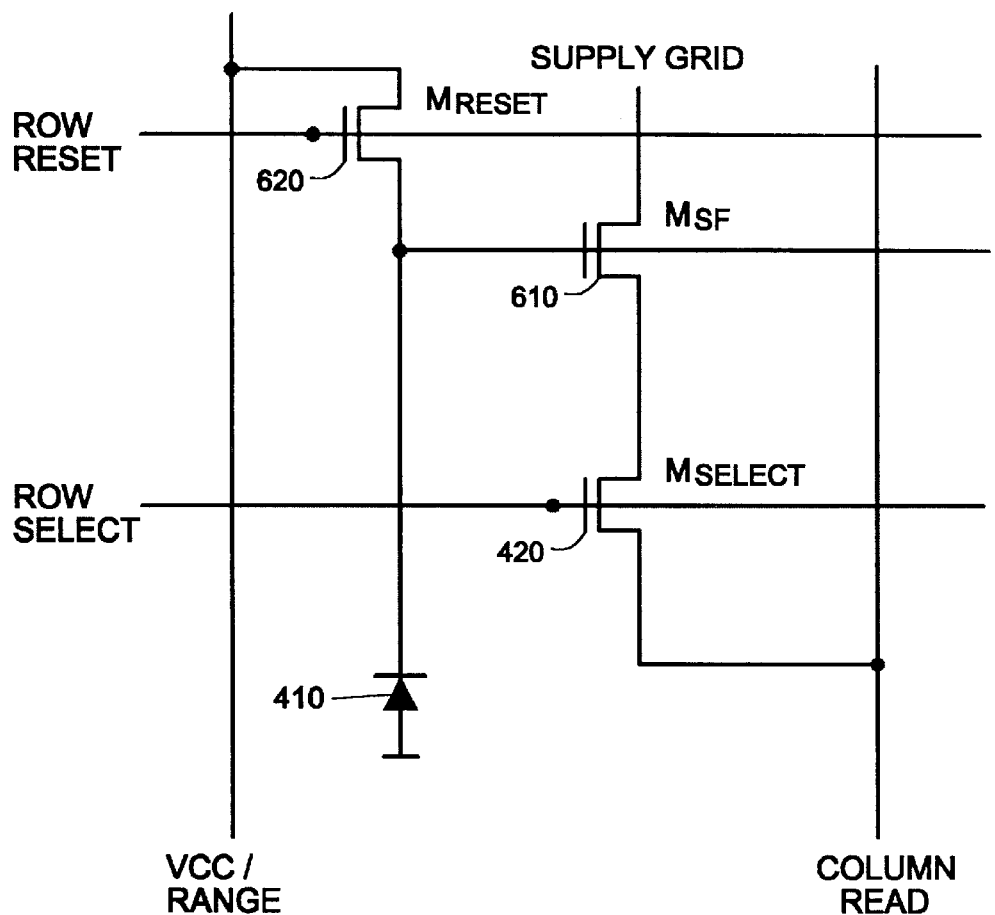
FIG. 6 is a schematic diagram of a portion of an example three-transistor active pixel cell used in an image sensor according to the present invention.

FIG. 6 is a schematic diagram of a portion of an example three-transistor active pixel cell 600 used in an image sensor according to the present invention. Three-transistor active pixel cell 600 operates in similar fashion to one-transistor passive pixel cell 400, except as described below. Each three-transistor active pixel cell comprises photodiode 410, select transistor 420, source-follower transistor 610, reset transistor 620, a row select line, a column read line, a row reset line, a supply grid signal and a Vcc/range signal. Reset transistor 620 is used to couple photodiode 410 to the Vcc/range signal.

Source-follower transistor 610 is configured to operate as a source-follower such that a voltage signal from photodiode 410 is buffered. In imaging mode, photodiode 410 is first reset to a certain voltage by activating reset transistor 620 such that photodiode 410 is coupled to the Vcc/range signal. The photocurrent will discharge the depletion layer capacitance of photodiode 410, which results in a voltage drop on photodiode 410. After integrating the photocurrent on the depletion layer capacitance, the final voltage is measured by coupling it to the column line after the voltage signal is buffered by the source-follower.

The Vcc/range signal operates according to two modes: imaging mode and range finder mode. In the imaging mode, the Vcc/range signal is connected to the Vcc power supply. In the range finder mode, the Vcc/range signal functions in similar fashion to the column read line in the one-transistor passive pixel cell 400 in range finder mode. The supply grid signal is used to supply power to source-follower transistor 610.

Figure 7:
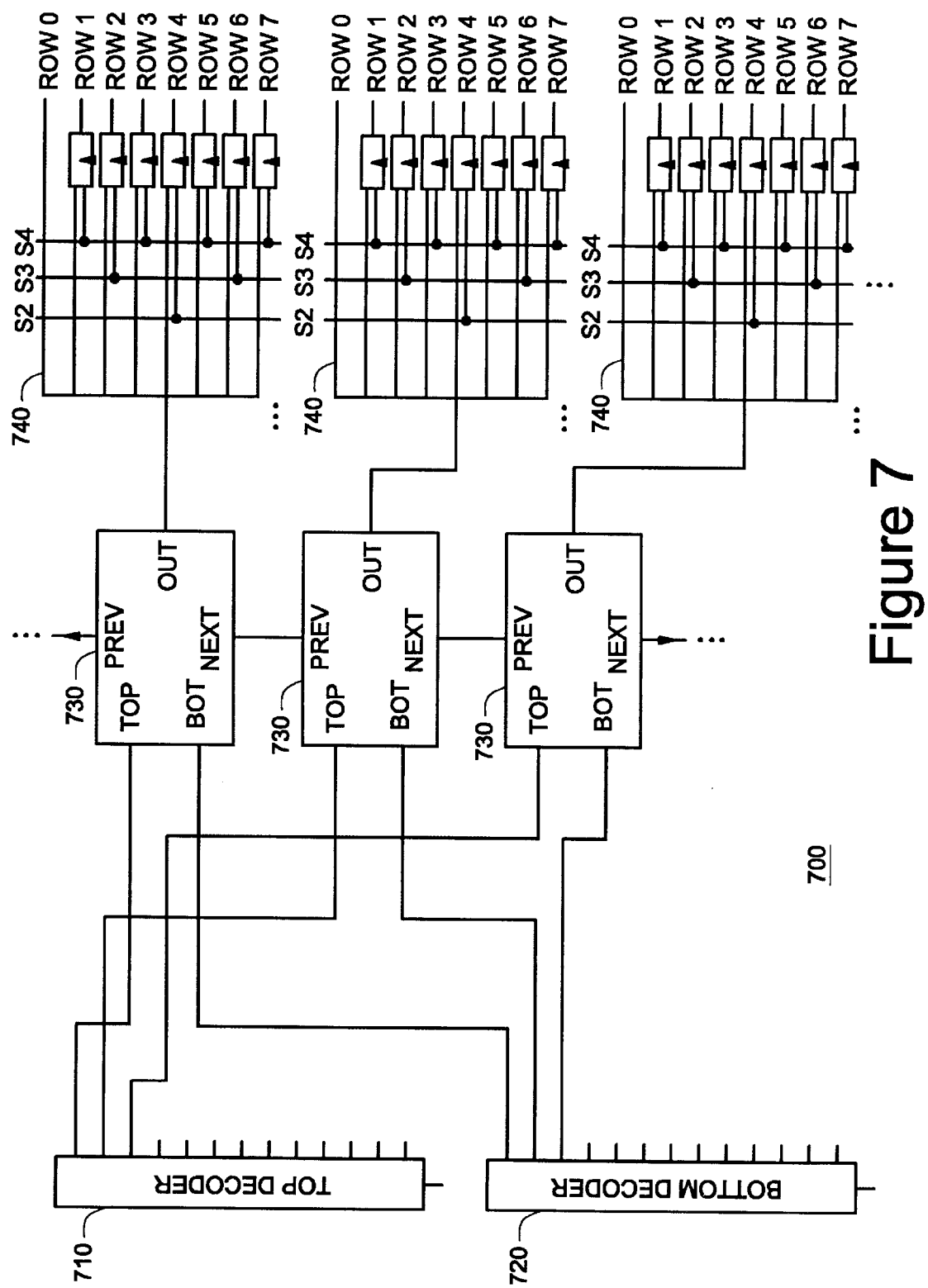
FIG. 7 is a schematic diagram of an example row/column block-select decoder in accordance with present invention.

FIG. 7 is a schematic diagram of an example row/column block-select decoder in accordance with present invention. Decoder 700 comprises the top decoder 710, bottom decoder 720, a sequence of step decoders 730, and a sequence of subsamplers 740. A step decoder 730 is used to select a small number of pixel rows (or columns) that a particular subsampler 740 controls. As explained below, subsampler 740 is used to select a subset of the rows (or columns) that it controls. Decoder 700 is used to select certain rows or columns that are within a set of target pixels. Although the following description describes decoder 700 with regard to selecting rows, the description also applies to cases where a second decoder 700 is used for selecting columns. In one embodiment, decoder 700 can select a single row, a contiguous group of rows that are defined by the top row in the bottom row, or a subsampled set of rows from within the contiguous group of rows.

Top decoder 710 is used to select a first row. The bottom decoder 720 is used to select a last row. Some of the outputs of decoders 710 and 720 have been omitted for the sake of simplicity. Likewise, instances of step decoder 730 and subsampler 740 have been omitted for the sake of simplicity. Each output of top decoder 710 selects a particular step decoder 730 and is coupled to the "TOP" input of the particular step decoder 730. Each output of bottom decoder 720 selects a particular step decoder is coupled to the bottom ("BOT") input of the particular step decoder 730.

The previous ("PREV") input of each step decoder 730 is coupled to the "NEXT" output of a step decoder 730 that has a sequentially higher address. The "PREV" input of the highest address step decoder 730 is assigned a logic value of zero. The logical value associated with the "OUT" terminal for each step decoder 730 is determined by the logical OR of the value of the "PREV" input and the value of the "TOP" input. Thus, the "OUT" terminal of each step decoder is arranged to select a particular subsampler 740 when the top row has been previously selected or is currently selected. The value of the "NEXT" output for each step decoder 730 is determined by the logical AND of the value of the "OUT" input and the inverse value of the "BOT" input. Thus, the "NEXT" output will allow the next step decoder to be selected if the top row was previously selected and the instant step selector is not the bottom row.

The "OUT" terminal of each step decoder 730 selects a particular subsampler 740. In one embodiment, subsampler 740 is configured to select every row, select every other row, or select every fourth row of subsampler 740. Every row is selected when select lines S2, S3, and S4 have a logical value of one. Every other row is selected when select lines S2 and S3 have a logical value of one and select line S4 has a logical value of zero. Every fourth row is selected when select line S2 has a logical value of one and select lines S3 and S4 have a logical value of zero. Every eighth row is selected when selects lines S2, S3, and S4 have a logical value of zero. Other embodiments may expand the selection capabilities of subsampler 740 in accordance with the above discussion. For example, subsampler 740 may be configured to select in addition every sixteenth row by the addition of another select line.

Figure 8:
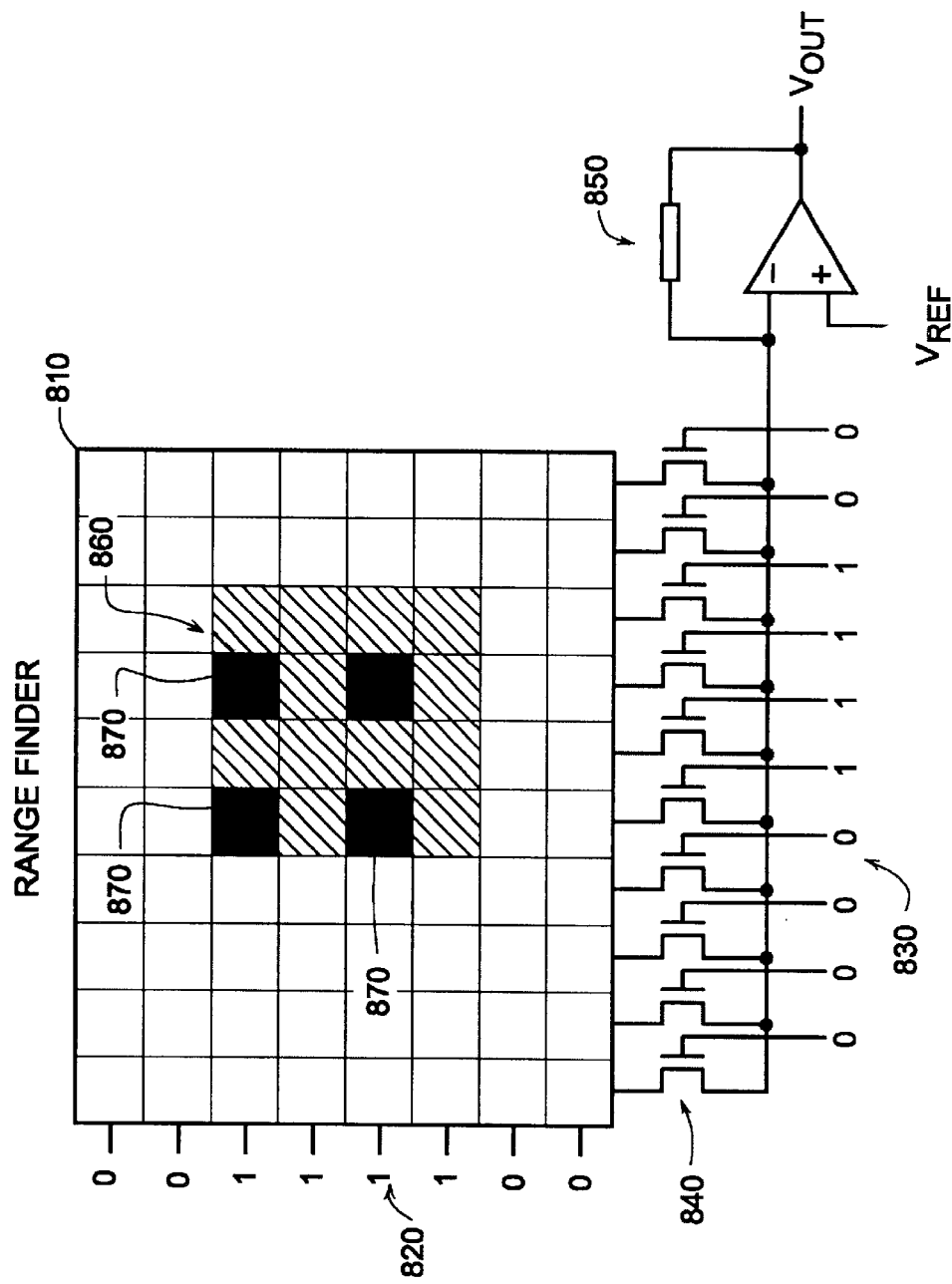
FIG. 8 is a schematic diagram of an example pixel array being used in a range-finding mode using subsampling for a selected set of target pixels according to the present invention.

FIG. 8 is a schematic diagram of an example pixel array being used in a range-finding mode using subsampling for a selected set of target pixels according to the present invention. Pixel array 810 is an array of pixel cells that contain photodiodes. Not all rows and columns of the array have been shown for the purpose of simplicity. The row select lines 820 and column mux select lines 830 are each produced by a decoder such as decoder 700. Each row select line 820 enables each of the pixel cells within a row selected by a particular row select line 820. Each column mux select line 830 enables a transistor in column mux 840 such that the current from the photodiode in every enabled pixel cell within the selected column can be read. In an example embodiment, current amplifier 850 is used to read in realtime the current produced by the pixel cell photodiodes that are row enabled and column selected.

Target block 860 is a four by four matrix of pixel cells that are defined by the intersection of four contiguous active row select lines 820 and four contiguous active column mux select lines 830. Subsampling of every other pixel cell for both rows and columns results in a selection of subsampled pixel cells 870. Subsampling allows the output of only subsampled pixel cells 870 to be presented to current amplifier 850 such that the output is less than the available output from all of the pixel cells in a target block. Reducing the available output advantageously allows the output signal from a large target block to be scaled. Scaling the output signal helps to ensure that the output signal from a large number of pixel cells does not exceed the input range of a buffer or a converter that is used to read the signal.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system for range-finding and imaging, the system comprising:
   a plurality of pixel cells that are arranged in a pixel array, wherein each pixel cell is configured to produce a real-time output signal that is proportional to the instantaneous magnitude of incident radiation upon the pixel cell;
   a pixel selector that is configured to select a group of the plurality of pixel cells, wherein the selected pixel cell group is associated with a set of target pixel cells; wherein the set of target pixel cells are associated with a selected target; and
   a summer that is configured to accumulate the real-time output signals from the selected pixel cell group and provide an accumulated signal, wherein the accumulated signal corresponds to the sum of the real-time output signals of the pixel cells of the selected pixel cell group.

2. The system of claim 1, further comprising:
   a receiver that is coupled to the pixel array and that is configured to receive an image and to irradiate the pixel array according to the received image;
   a transmitter that is configured to transmit a pulse of coherent light; and
   a central processing unit that is coupled to the transmitter and receiver and that is configured to determine an interval of time between an emitted pulse and a detection of a reflection from the image of the accumulated signal.

3. The system of claim 2, wherein the receiver is further configured to produce an image signal in response to the irradiated pixel array.

4. The system of claim 3, wherein the transmitter is further configured to illuminate a scene and the receiver is further configured to receive an image from the illuminated scene.

5. The system of claim 3, wherein the central processing unit is configured to determine the set of target pixels in response to the image signal.

6. The system of claim 5, wherein the central processing unit is configured to determine a range for each identified target in a received image.

7. The system of claim 1, wherein the pixel selector comprises:
   a row-range decoder wherein the row-range decoder is configured to select rows of pixel cells in a row-range that is defined by a top row and a bottom row;
   a column-range decoder wherein the column-range decoder is configured to select columns of pixel cells in a column-range that is defined by a left column and a right column.

8. The system of claim 1, wherein the pixel selector selects pixel cells such that the selected pixel cells represent a subsampling of the set of target pixel cells.

9. A system for range-finding, comprising:
   means for selecting a set of pixel cells in a pixel cell array;
   means for producing a real-time output signal for each selected pixel cell that is proportional to the instantaneous magnitude of incident radiation upon each selected pixel cell;
   means for summing the real-time output signals from a plurality of the selected pixel cells; and
   means for providing an accumulated signal in response to the summing of the real-time output signals from the plurality of selected pixel cells.

10. The system of claim 9, further comprising means for defining a set of target pixel cells that corresponds to a target identified in the image.

11. The system of claim 10, further comprising means for defining sets of target pixel cells that correspond to a plurality of targets identified in the image.

12. The method of claim 10, further comprising
   means for emitting a pulse of coherent light;
   means for receiving an image that has been illuminated by the emitted pulse of coherent light; and
   means for irradiating the pixel array according to the received image.

13. The method of claim 9, wherein the means for summing of the real-time output signals comprises:
   means for accumulating the real-time output signals of selected pixel cells within each column of the pixel cell array; and means for accumulating the accumulated real-time output signals from each column.

14. A method for range-finding, comprising:
   selecting a set of pixel cells in a pixel cell array;
   producing a real-time output signal for each selected pixel cell that is proportional to the instantaneous magnitude of incident radiation upon each selected pixel cell;
   summing the real-time output signals from a plurality of the selected pixel cells; and
   providing an accumulated signal in response to the summing of the real-time output signals from the plurality of selected pixel cells.

15. The method of claim 14, further comprising defining a set of target pixel cells that correspond to a target identified in the image.

16. The method of claim 14, further comprising defining a set of target pixel cells that corresponds to each target identified in the image.

17. The method of claim 14, further comprising providing an image signal in response to light irradiating the pixel cell array.

18. The method of claim 14, further comprising
   emitting a pulse of coherent light;
   receiving an image that has been illuminated by the emitted pulse of coherent light; and
   irradiating the pixel array according to the received image.

19. The method of claim 18, further comprising
   detecting the presence of the irradiation of the pixel array by monitoring the accumulated signal; and
   determining an interval of time between the emitted pulse and the detected presence of the irradiation of the pixel array in the accumulated signal.

20. The method of claim 14, wherein the summing of the real-time output signals comprises:
   accumulating the real-time output signals of selected pixel cells within each column of the pixel cell array; and
   accumulating the accumulated real-time output signals from each column.

* * * * *